US012654470B2

(12) United States Patent
Eto et al.

(10) Patent No.: US 12,654,470 B2
(45) **Date of Patent: *Jun. 16, 2026**

(54) INKJET RECORDING DEVICE

(71) Applicant: KYOCERA CORPORATION, Kyoto (JP)

(72) Inventors: Daisuke Eto, Kyoto (JP); Masahiro Higashitani, Kyoto (JP); Hiroatsu Tamai, Kyoto (JP); Masaaki Maruta, Kyoto (JP); Tomoya Hotani, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 171 days.

This patent is subject to a terminal disclaimer.

(21) Appl. No.: 18/551,194

(22) PCT Filed: Mar. 16, 2022

(86) PCT No.: PCT/JP2022/011844

§ 371 (c)(1),
(2) Date: Sep. 19, 2023

(87) PCT Pub. No.: WO2022/202521

PCT Pub. Date: Sep. 29, 2022

(65) Prior Publication Data

US 2024/0165961 A1 May 23, 2024

(30) Foreign Application Priority Data

Mar. 24, 2021 (JP) ................................ 2021-049454

(51) Int. Cl.

*B41J 11/00* (2006.01)
*B41J 2/21* (2006.01)
*B41J 3/407* (2006.01)

(52) U.S. Cl.

CPC .......... *B41J 11/0015* (2013.01); *B41J 2/2114* (2013.01); *B41J 2/2117* (2013.01); *B41J 3/4078* (2013.01)

(58) Field of Classification Search

CPC ..... B41J 11/0015; B41J 2/2114; B41J 2/2117; B41J 3/4078; B41J 2/15; B41J 11/0045; B41J 11/008; B41J 25/001

See application file for complete search history.

(56) References Cited

U.S. PATENT DOCUMENTS 6,439,708 B1 8/2002 Kato et al.
12,076,994 B2 * 9/2024 Eto ........................ B41J 2/1433

(Continued)

FOREIGN PATENT DOCUMENTS

EP 1022151 A1 7/2000
JP 2006247991 A 9/2006

(Continued)

*Primary Examiner* — Justin Seo

(74) *Attorney, Agent, or Firm* — HAUPTMAN HAM, LLP

(57) ABSTRACT

An inkjet recording device including a conveyance unit, a carriage, at least one preprocessing head, at least one ink head, and at least one postprocessing head, in which the conveyance unit conveys a recording medium in a prescribed conveyance direction, the carriage reciprocates along a main scanning direction that intersects the conveyance direction, the at least one preprocessing head is on the carriage configured to eject a non-coloring preprocessing solution, the at least one ink head is on the carriage configured to eject an ink, the at least one postprocessing head is on the carriage configured to eject a non-coloring postprocessing solution, and the at least one preprocessing head, the at least one ink head, and the at least one postprocessing head are arranged to be shifted from each other in the conveyance direction.

10 Claims, 10 Drawing Sheets

(56) References Cited

U.S. PATENT DOCUMENTS

| | | | |
|---|---|---|---|
| 2011/0175219 | A1 | 7/2011 | Cellura et al. |
| 2011/0235069 | A1 | 9/2011 | Otsuka et al. |
| 2012/0018838 | A1 | 1/2012 | Cellura et al. |
| 2015/0314615 | A1 | 11/2015 | Humet et al. |
| 2017/0008276 | A1 | 1/2017 | Humet et al. |
| 2019/0264056 | A1 | 8/2019 | Okuda et al. |

FOREIGN PATENT DOCUMENTS

| | | | | |
|---|---|---|---|---|
| JP | 6091640 | B2 | 3/2017 | |
| JP | 2017094673 | A | 6/2017 | |
| JP | 2019147307 | A | 9/2019 | |
| WO | WO-2022114009 | A1 * | 6/2022 | ............ B41J 2/2114 |

* cited by examiner

INKJET RECORDING DEVICE

RELATED APPLICATIONS

The present application is a National Phase of International Application Number PCT/JP2022/011844 filed Mar. 16, 2022, which claims the benefit of priority from Japanese Patent Application No. 2021-049454, filed on Mar. 24, 2021.

TECHNICAL FIELD

The present disclosure relates to an inkjet recording device including ink heads mounted on a carriage that moves in the main scanning direction.

BACKGROUND ART

An inkjet recording device such as an inkjet printer includes an ink head that ejects an ink for image formation toward a recording medium.

When the recording medium is wide, the ink head is mounted on a carriage that reciprocates in the main scanning direction. During the recording process, the recording medium is intermittently fed in a prescribed conveyance direction (sub scanning direction), and the carriage is reciprocated in the main scanning direction while the recording medium is stopped. When the carriage moves, an ink (coloring ink) is ejected from the ink head.

Patent Literature 1 discloses a technique of applying a preprocessing solution to a recording medium before ejecting a coloring ink to the recording medium, while applying a postprocessing solution to the recording medium after ejecting the coloring ink to the recording medium. The preprocessing solution is, for example, a processing solution for improving fixability of the ink to the recording medium and cohesiveness of ink pigments. The postprocessing solution is, for example, a processing solution for enhancing fastness of a printed image. The carriage of the inkjet recording device includes a preprocessing head that ejects the preprocessing solution and a postprocessing head that ejects the postprocessing solution, in addition to the ink head.

CITATION LIST

Patent Literature

Patent Literature 1: Japanese Unexamined Patent Publication No. 2017-094673

SUMMARY OF INVENTION

An inkjet recording device according to one aspect of the present disclosure includes a conveyance unit, a carriage, at least one preprocessing head, at least one ink head, and at least one postprocessing head. The conveyance unit conveys a recording medium in a conveyance direction. The carriage reciprocates along a main scanning direction that intersects the conveyance direction. The at least one preprocessing head is on the carriage configured to eject a non-coloring preprocessing solution. The at least one ink head is on the carriage configured to eject an ink. The at least one postprocessing head is on the carriage configured to eject a non-coloring postprocessing solution. The at least one preprocessing head, the at least one ink head, and the at least one postprocessing head are arranged to be shifted from each other in the conveyance direction.

DESCRIPTION OF EMBODIMENTS

An inkjet recording device according to each embodiment of the present disclosure will be described below with reference to the drawings. In these embodiments, as a specific example of the inkjet recording device, an inkjet printer including ink heads that eject an ink for image formation on a wide, long recording medium is exemplified. The inkjet printer is suitable for digital textile printing in which images such as letters and patterns are printed by an inkjet method on a recording medium including fabrics such as woven and knitted fabrics. Of course, the inkjet recording device according to the present disclosure can also be used for usage of printing various inkjet images on a recording medium such as paper sheets and resin sheets.

[Overall Configuration of Inkjet Printer]

Figure 1:
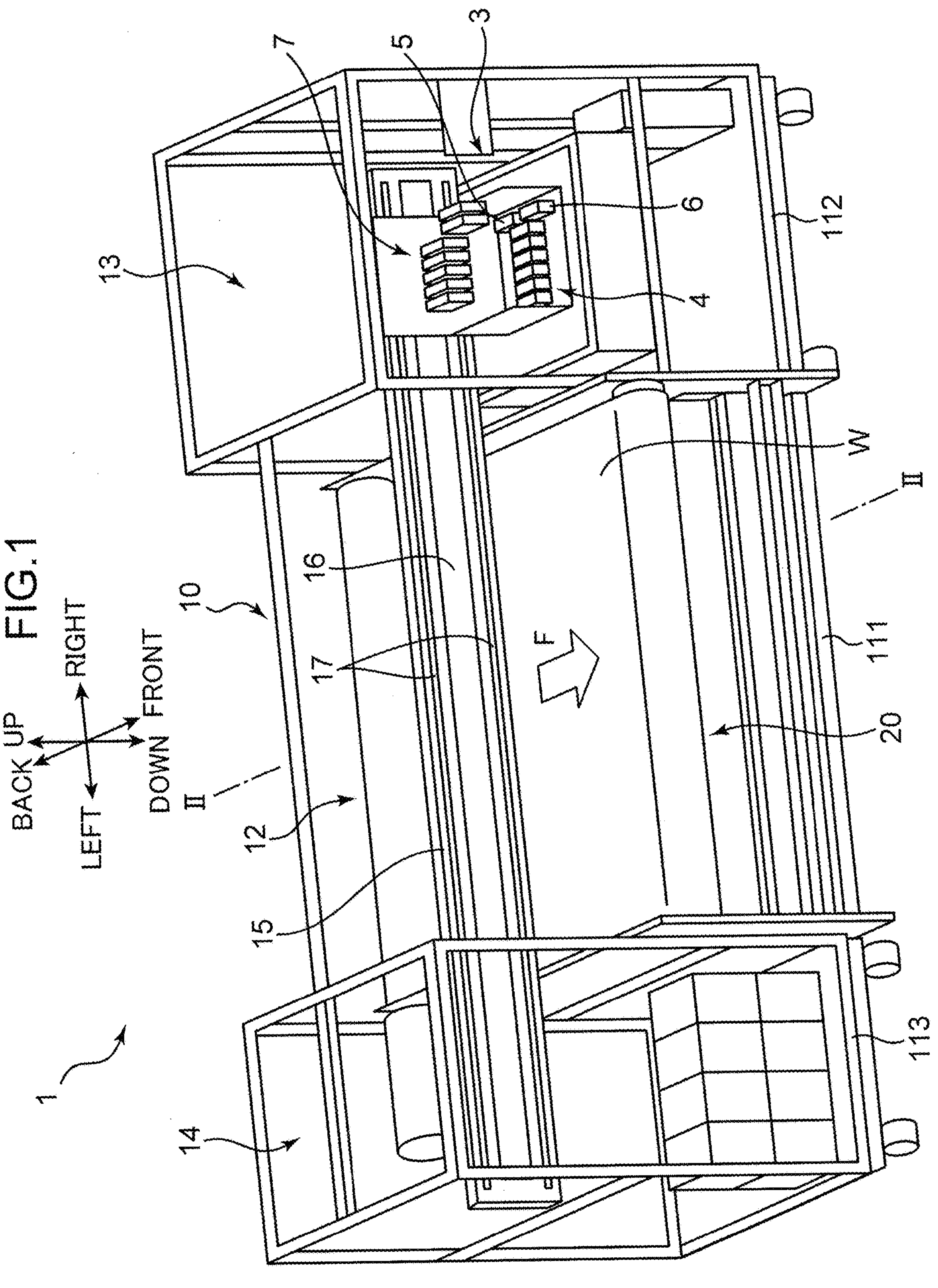
FIG. 1 is a perspective view showing an overall configuration of an inkjet recording device according to one embodiment of the present disclosure.
Figure 2:
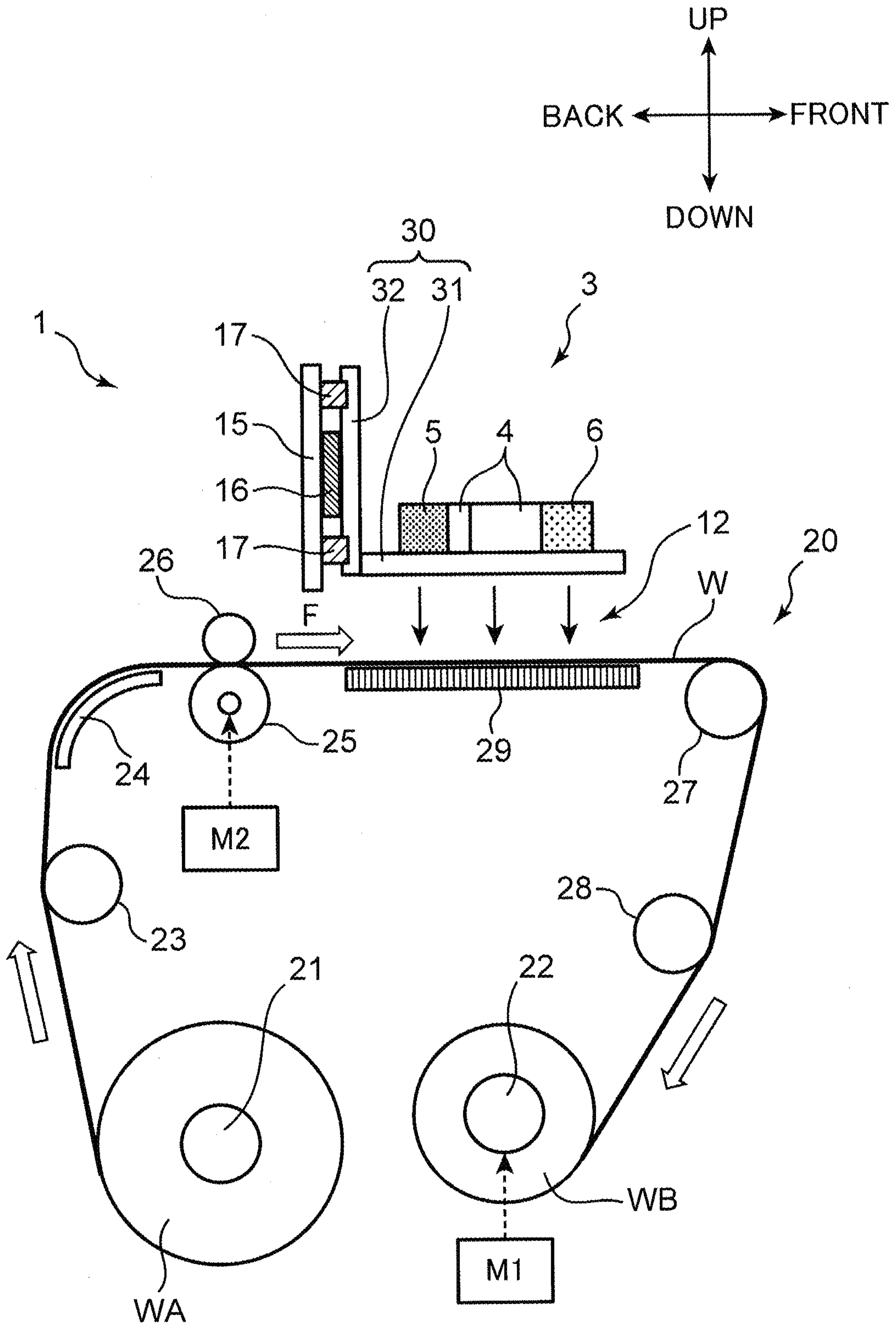
FIG. 2 is a schematic cross-sectional view taken along the line II-II of FIG. 1.

FIG. 1 is a perspective view showing the overall configuration of an inkjet printer 1 according to the first embodiment of the present disclosure, and FIG. 2 is a schematic cross-sectional view taken along the line II-II of FIG. 1. The inkjet printer 1 is a printer that prints an image on a wide, long workpiece W (recording medium) by using the inkjet method, and includes a device frame 10, and a workpiece conveyance unit 20 (conveyance unit) and a carriage 3 incorporated in the device frame 10. Note that in the present embodiment, the right-and-left direction is a main scanning direction S (FIG. 3) when printing on the workpiece W, and the direction from back to front is a sub scanning direction (conveyance direction F of workpiece W).

The device frame 10 forms a framework for mounting various components of the inkjet printer 1. The workpiece conveyance unit 20 is a mechanism that intermittently feeds (conveys) the workpiece W such that the workpiece W passes through a print region where inkjet print processing is executed (image forming position) in the conveyance direction F from back to front. The carriage 3 carries ink heads 4, a preprocessing head 5, a postprocessing head 6, and sub-tanks 7, and reciprocates in the main scanning direction S (right-and-left direction) that intersects the conveyance direction F of the workpiece W during the inkjet print processing.

The device frame 10 includes a central frame 111, a right frame 112, and a left frame 113. The central frame 111 forms a framework for mounting various components of the inkjet printer 1, and has a right-and-left width according to the workpiece conveyance unit 20. The right frame 112 and the left frame 113 are erected immediately on the right side and left side of the central frame 111, respectively. An area between the right frame 112 and the left frame 113 is a print area 12 where the print processing is executed on the workpiece W.

The right frame 112 forms a maintenance area 13. The maintenance area 13 is an area where the carriage 3 is evacuated when the print processing is not executed. In the maintenance area 13, cleaning processing, purge processing, and the like of nozzles (ejection holes) of the ink heads 4, the preprocessing head 5, and the postprocessing head 6 are executed, and a cap is fitted. The left frame 113 forms a return area 14 for the carriage 3. The return area 14 is a region where the carriage 3 that executes main scan in the print area 12 from right to left in the print processing temporarily enters when executing main scan in the opposite direction.

A carriage guide 15 is assembled into the upper side of the device frame 10 to allow the carriage 3 to reciprocate in the right-and-left direction. The carriage guide 15 is a plate-like member long in the right-and-left direction and is disposed above the workpiece conveyance unit 20. A timing belt 16 (moving member) is assembled into the carriage guide 15 to allow circling movement in the right-and-left direction (main scanning direction). The timing belt 16 is an endless belt and is driven to allow leftward or rightward circling movement by a carriage drive unit 3S described later.

The carriage guide 15 includes one pair of upper and lower guide rails 17 (holding member) that holds the carriage 3 in the main scanning direction S in a state where reciprocation is possible extending parallel in the right-and-left direction. The carriage 3 is engaged with the guide rails 17. The carriage 3 is fixed to the timing belt 16. With leftward or rightward circling movement of the timing belt 16, the carriage 3 moves leftward or rightward along the carriage guide 15 while being guided by the guide rails 17.

Mainly with reference to FIG. 2, the workpiece conveyance unit 20 includes a delivery roller 21 that delivers the workpiece W before printing, and a take-up roller 22 that takes up the workpiece W after printing. The delivery roller 21 is disposed at the rear lower part of the device frame 10, and is a winding shaft of a delivery roll WA, which is a winding body of the workpiece W before printing. The take-up roller 22 is disposed at the front lower part of the device frame 10, and is a winding shaft of a take-up roll WB, which is a winding body of the workpiece W after print processing. A first motor M1 is attached to the take-up roller 22 to drive the take-up roller 22 to rotate about the shaft to execute the take-up operation of the workpiece W.

The route between the delivery roller 21 and the take-up roller 22 and passing through the print area 12 is the conveyance route for the workpiece W. In this conveyance route, a first tension roller 23, a workpiece guide 24, a conveyance roller 25, a pinch roller 26, a return roller 27, and a second tension roller 28 are disposed in order from the upstream side. The first tension roller 23 applies prescribed tension to the workpiece W upstream of the conveyance roller 25. The workpiece guide 24 changes the conveyance direction of the workpiece W from the upward direction to the forward direction, and conveys the workpiece W to the print area 12.

The conveyance roller 25 is a roller that generates conveyance force that intermittently feeds the workpiece W in the print area 12. The conveyance roller 25 is driven to rotate about a shaft by a second motor M2, and intermittently conveys the workpiece W forward (prescribed conveyance direction F) such that the workpiece W passes through the print area 12 opposite the carriage 3 (image forming position) at a prescribed conveyance pitch. The pinch roller 26 is disposed to face the conveyance roller 25 from above, and forms a conveyance nip with the conveyance roller 25.

The return roller 27 changes the conveyance direction of the workpiece W that has passed through the print area 12 from forward to downward, and guides the workpiece W after the print processing to the take-up roller 22. The second tension roller 28 applies prescribed tension to the workpiece W downstream of the conveyance roller 25. In the print area 12, a platen 29 is disposed below the conveyance route for the workpiece W.

The carriage 3 reciprocates in the main scanning direction S (right-and-left direction in the present embodiment) that intersects the conveyance direction F (orthogonal in the present embodiment) in the print region (image forming position) while being cantilevered by the guide rails 17. The carriage 3 includes: a carriage frame 30; and the ink heads 4, the preprocessing head 5, the postprocessing head 6, and the sub-tanks 7 mounted on the carriage frame 30. The carriage frame 30 includes a head support frame 31 and a back frame 32 (engagement unit).

The head support frame 31 is a horizontal plate holding the heads 4 to 6 described above. The back frame 32 is a vertical plate extending upward from the rear edge of the head support frame 31. As described above, the timing belt 16 is fixed to the back frame 32. The guide rails 17 are engaged with the back frame 32. That is, in the present embodiment, the back frame 32 is an engagement unit held by the guide rails 17 in a cantilevered state. The head support frame 31 is a horizontal plate whose rear end side is cantilevered to the guide rails 17 by the engagement unit.

Note that the cantilevered state means that the engagement unit (back frame 32) exists only on one side of the upstream side or downstream side of the center of the carriage 3 in the conveyance direction F, and that another engagement unit does not exist on the opposite side of the engagement unit in the carriage 3. The engagement unit is a portion held by the guide rails 17, which is a holding member. The engagement unit may further be disposed outside the range where the ink heads 4 and the processing heads are arranged in the conveyance direction F. That is, the engagement unit may be disposed only on the upstream side or only on the downstream side of the range in which the ink heads 4 and the processing heads are arranged in the conveyance direction F.

[Details of Carriage]

Figure 3:
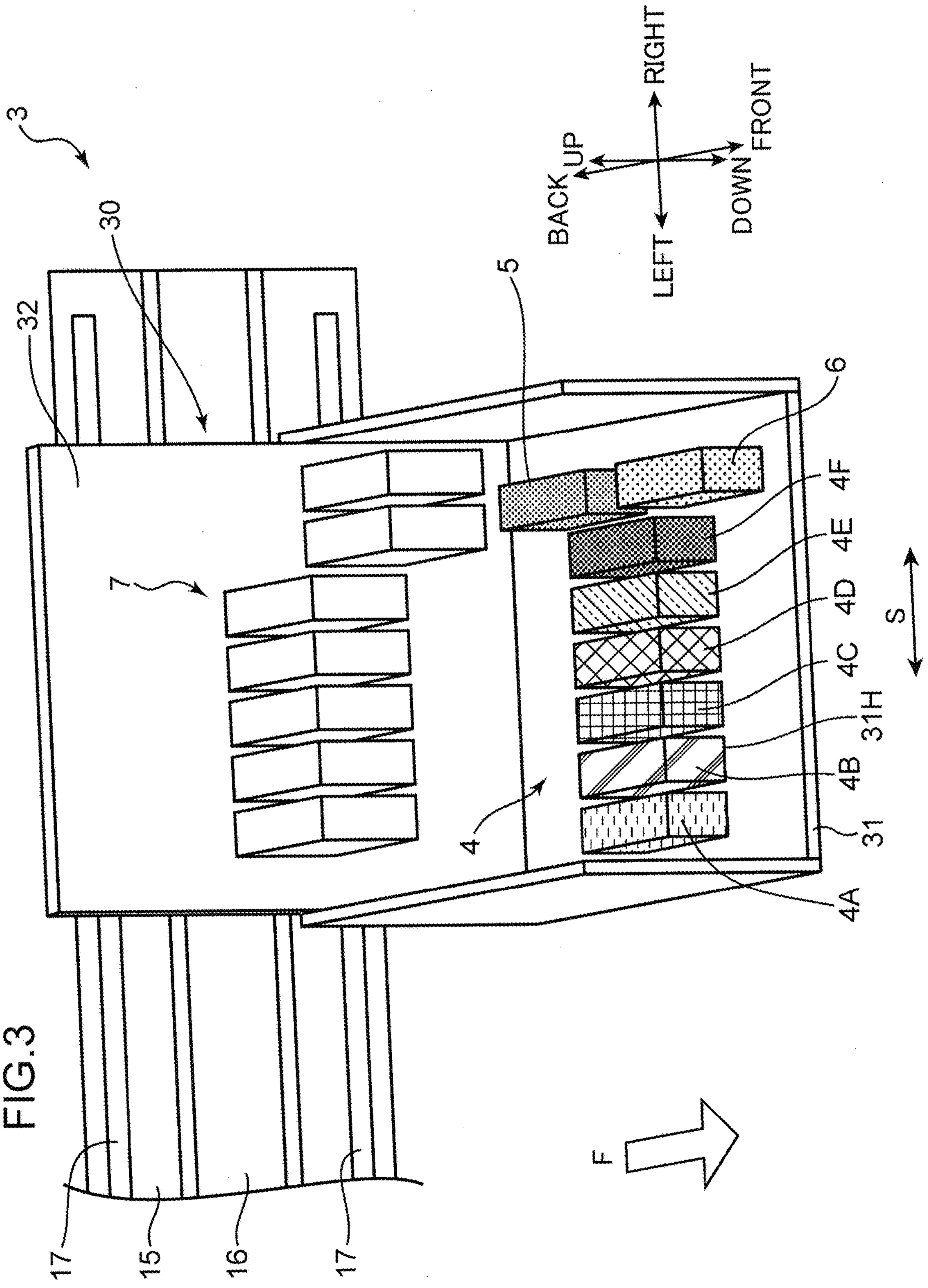
FIG. 3 is an enlarged perspective view of a carriage shown in FIG. 1.

Further description of the carriage 3 will be added. FIG. 3 is an enlarged perspective view of the carriage 3 shown in FIG. 1. FIG. 3 shows the conveyance direction F of the workpiece W (sub scanning direction) and the main scanning direction S, which is a movement direction of the carriage 3. FIG. 3 shows an example in which the plurality of ink heads 4 that ejects the ink for image formation to the workpiece W, the preprocessing head 5 and the postprocessing head 6 that eject the non-coloring processing solutions that do not produce color, and the plurality of sub-tanks 7 that supplies the ink and the processing solutions to the heads 4 to 6 are mounted on the carriage 3.

Each of the ink heads 4 includes, for example, a large number of nozzles (ink ejection holes) that eject ink droplets by an ejection method such as the piezo method using a piezo element or the thermal method using a heating element, and an ink passage that guides the ink to the nozzles. As the ink, for example, a water-based pigment ink containing a water-based solvent, a pigment, and a binding resin can be used. Note that the ink may contain dyes instead of pigments. Therefore, hereinafter, the concept including pigments and dyes may be expressed as coloring matters. The plurality of ink heads 4 in the present embodiment includes first to sixth ink heads 4A to 4F that each eject inks of six colors different from each other. For example, the first ink head 4A ejects an orange ink, the second ink head 4B ejects a green ink, the third ink head 4C ejects a yellow ink, the fourth ink head 4D ejects a red ink, the fifth ink head 4E ejects a blue ink, and the sixth ink head 4F ejects a black ink.

The ink heads 4A to 4F of respective colors are mounted on the head support frame 31 of the carriage 3 so as to align in the main scanning direction S. The ink heads 4A to 4F of respective colors each include one head.

The preprocessing head 5 and the postprocessing head 6 are arranged at positions different from the ink heads 4 in the conveyance direction F. The preprocessing head 5 is arranged upstream of the ink heads 4 in the conveyance direction F. FIG. 3 shows an example in which one preprocessing head 5 is arranged near the right end of an array of the ink heads 4. Similarly, the postprocessing head 6 is arranged downstream of the ink heads 4 in the conveyance direction F. FIG. 3 shows an example in which one postprocessing head 6 is arranged at the right end of the array of the ink heads 4. In another embodiment, a plurality of the preprocessing heads 5 or a plurality of the postprocessing heads 6 may be arranged. That is, the carriage 3 includes at least one preprocessing head 5 and at least one postprocessing head 6.

The preprocessing head 5 ejects a preprocessing solution for applying prescribed preprocessing to the workpiece W. The preprocessing solution is ejected from the preprocessing head 5 to a position, from the ink heads 4, of the workpiece W where the ink has not yet been ejected from the ink heads 4. The preprocessing solution is a non-coloring processing solution that does not produce color even if the solution adheres to the workpiece W, and is, for example, a processing solution that exhibits functions such as enhancing fixability of the ink to the workpiece W and cohesiveness of ink pigments (coloring matters). As such a preprocessing solution, a processing solution in which a binding resin is blended in a solvent, or a processing solution in which a positively charged cationic resin is blended in a solvent can be used.

The postprocessing head 6 ejects a postprocessing solution for applying prescribed postprocessing to the workpiece W to which the ink has adhered. The postprocessing solution is ejected from the postprocessing head 6 at a position of the workpiece W after the ink is ejected from the ink heads 4. The postprocessing solution is a non-coloring processing solution that does not produce color even if the solution adheres to the workpiece W similarly, and is a processing solution that exhibits the function of enhancing fixability and fastness (resistant to rubbing and scraping) of an ink image printed on the workpiece W by the ink heads 4. As such a postprocessing solution, a silicone-based processing solution or the like can be used. Note that the postprocessing solution and the preprocessing solution are different processing solutions. Specifically, components included in the postprocessing solution and the preprocessing solution are different.

Here, the non-coloring processing solution indicates that when printed independently on the recording medium, color development is not recognized with the human naked eye. The color mentioned here includes colors with saturation of 0, such as black, white, and gray. The non-coloring processing solution is basically a transparent solution, but for example, one-liter processing solution is not completely transparent when viewed in a solution form, but may appear slightly white or other colors. Such a color is so faint that color development cannot be recognized with the human naked eye when printed independently on the recording medium. Note that depending on the type of the processing solution, when printed on the recording medium independently, a change such as gloss may occur on the recording medium, but such a state is not color development.

In the present embodiment, the preprocessing solution and the postprocessing solution may be ejected substantially all over the workpiece W, or the preprocessing solution and the postprocessing solution may be selectively ejected in accordance with the image to be printed, as with the ink.

Subsequently, a case of selectively ejecting the preprocessing solution and the postprocessing solution will be described. As described above, the preprocessing solution, the ink, and the postprocessing solution are ejected in this order on the workpiece W where colors are printed in accordance with the image. In this case, the ink may be of one color or of a plurality of colors. Basically, the preprocessing solution and the postprocessing solution are not ejected to areas where no color is printed, that is, areas where the ink is not ejected. Note that to adjust the quality of the image to be printed and the texture of the workpiece W, part of ejection selection of the preprocessing solution and the postprocessing solution may be different from ink ejection.

Openings 31H (FIG. 3) are provided at head arrangement places of the head support frame 31. The ink heads 4A to 4F, the preprocessing head 5, and the postprocessing head 6 are assembled to the head support frame 31 to fit into respective openings 31H. The nozzles arranged on the lower end surface of each of the heads 4, 5, and 6 are exposed from each opening 31H.

The sub-tanks 7 are supported by the carriage 3 above the heads 4, 5, and 6 via a holding frame (not shown). The sub-tanks 7 are provided corresponding to respective heads 4, 5, and 6. Respective sub-tanks 7 are supplied with the ink or processing solution from a cartridge or main tank (not shown) containing the ink and processing solution. Respective sub-tanks 7 supply the ink or processing solution to the heads 4, 5, and 6. Respective sub-tanks 7 and the heads 4, 5, and 6 are connected by pipelines that are not shown in FIG. 3.

As described above, the inkjet printer 1 according to the present embodiment is an all-in-one printer in which three types of heads including the ink heads 4, the preprocessing head 5, and the postprocessing head 6 are mounted on one carriage 3. With the inkjet printer 1, for example, in the textile printing process of executing inkjet printing on fabric in digital textile printing, the ejection process of the preprocessing solution and the ejection process of the postprocessing solution can be executed integrally. Therefore, the textile printing process can be simplified and the textile printing device can be made compact.

[Printing Method]

Figure 4:
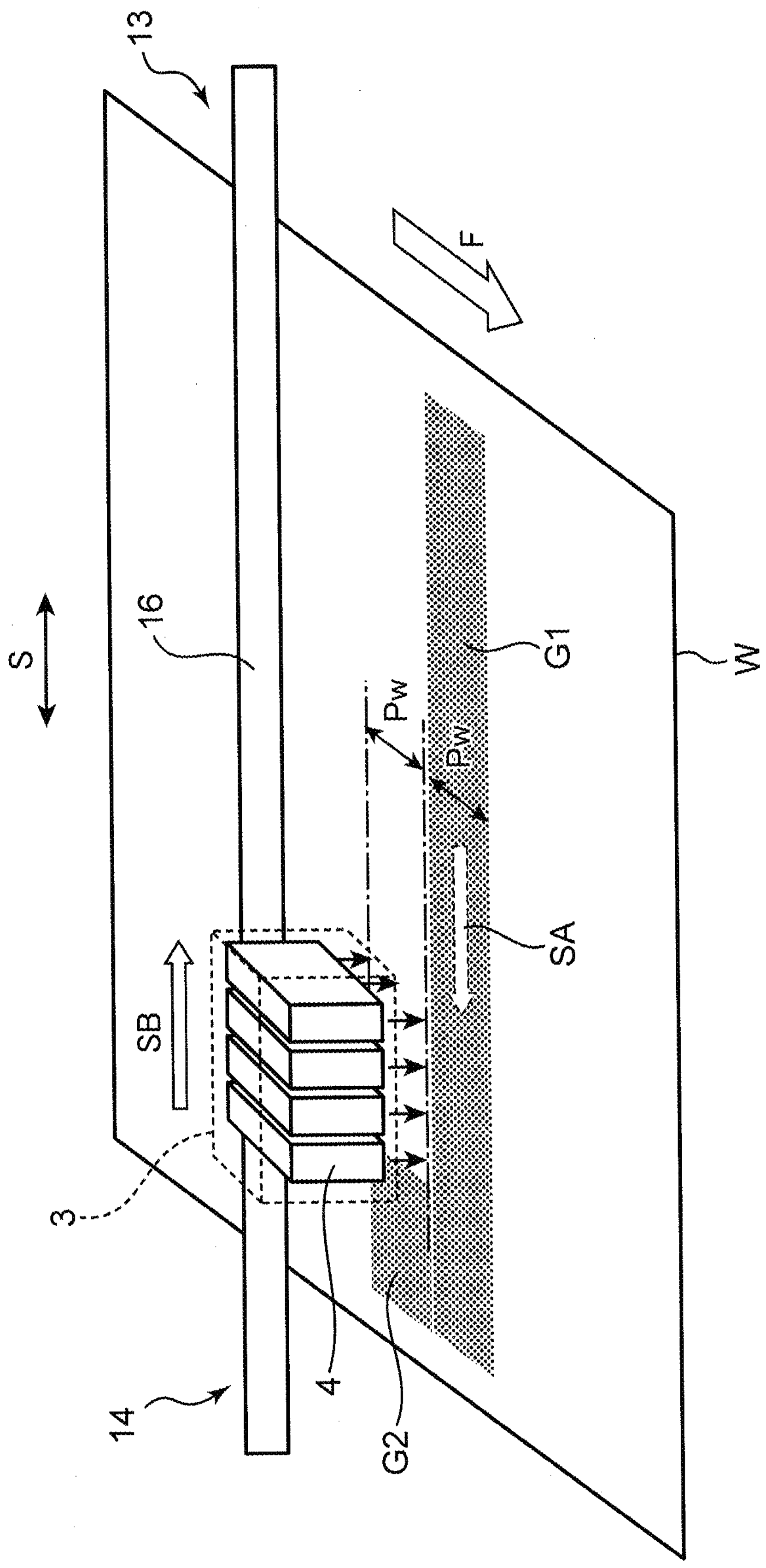
FIG. 4 is a schematic diagram showing a serial printing method adopted in one embodiment of the present disclosure.

Subsequently, the printing method executed by the inkjet printer 1 according to the present embodiment will be described. The inkjet printer 1 executes the print processing on the workpiece W by the serial printing method. FIG. 4 is a schematic diagram showing the serial printing method. FIG. 4 simply depicts the carriage 3 by omitting the preprocessing head 5 and the postprocessing head 6.

When the workpiece W has a wide size, it is not possible to print while continuously feeding the workpiece W. The serial printing method is a printing method repeating reciprocation of the carriage 3 on which the ink heads 4 of respective colors are mounted in the main scanning direction S and intermittent feeding of the workpiece W in the conveyance direction F. Here, it is assumed that the ink heads 4 have a prescribed printing width Pw in the conveyance direction F. The printing width Pw is substantially equal to the arrangement range of the ink ejection nozzles of the ink heads 4. Note that in FIG. 4 and FIGS. 5A and 5B described below, the width of each head in the conveyance direction F and the printing width Pw are drawn to be substantially the same. Actually, the width of each head in the conveyance direction F is larger than the printing width Pw and the arrangement range of the ejection nozzles.

FIG. 4 shows the state where the carriage 3 has moved in the forward path direction SA in the main scanning direction S and printing of a belt-shaped image G1 with the printing width Pw has been completed. During the main scan in the forward path direction SA, feeding of the workpiece W is stopped. After printing the belt-shaped image G1, the workpiece W is sent in the conveyance direction F by a pitch corresponding to the printing width Pw. At this time, the carriage 3 waits in the return area 14 on the left end side. After sending the workpiece W, the carriage 3 turns back in the return path direction SB as the timing belt 16 reverses the movement. The workpiece W is in a stopped state. Then, as shown in FIG. 4, while moving in the return path direction SB, the carriage 3 prints a belt-shaped image G2 with the printing width Pw on the upstream side of the belt-shaped image G1. Similar operations are repeated thereafter.

Figure 5A:
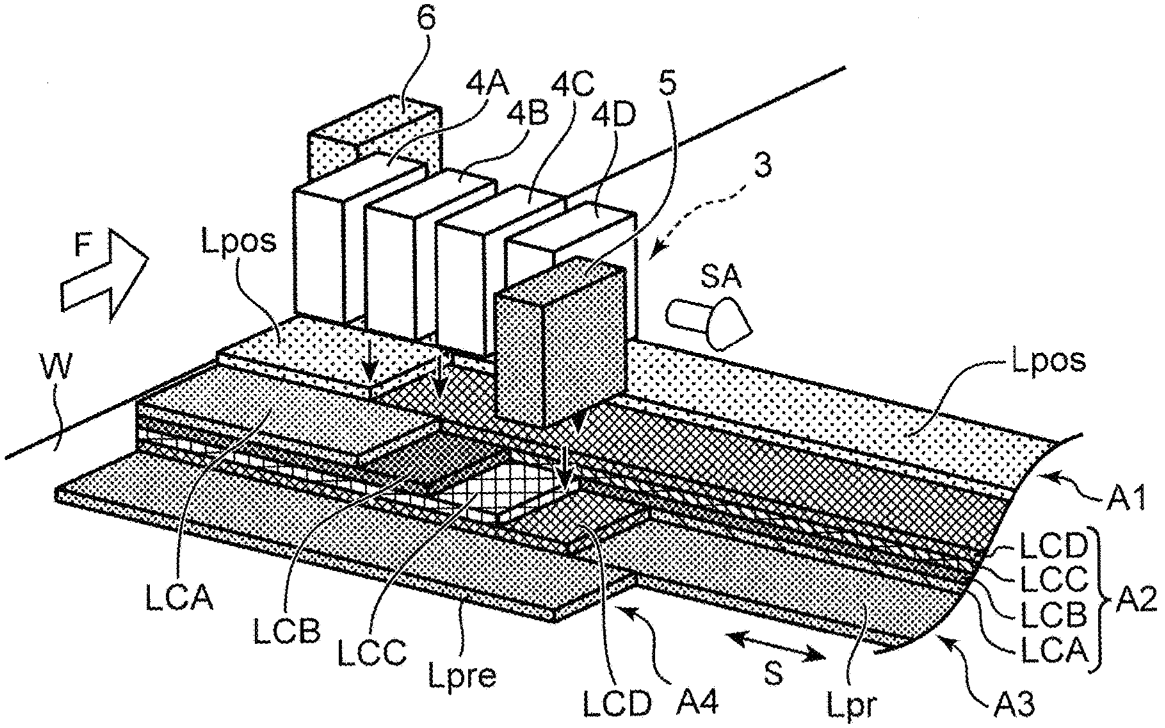
FIG. 5A is a schematic diagram showing a printing situation in a forward path and return path of the carriage.
Figure 5B:
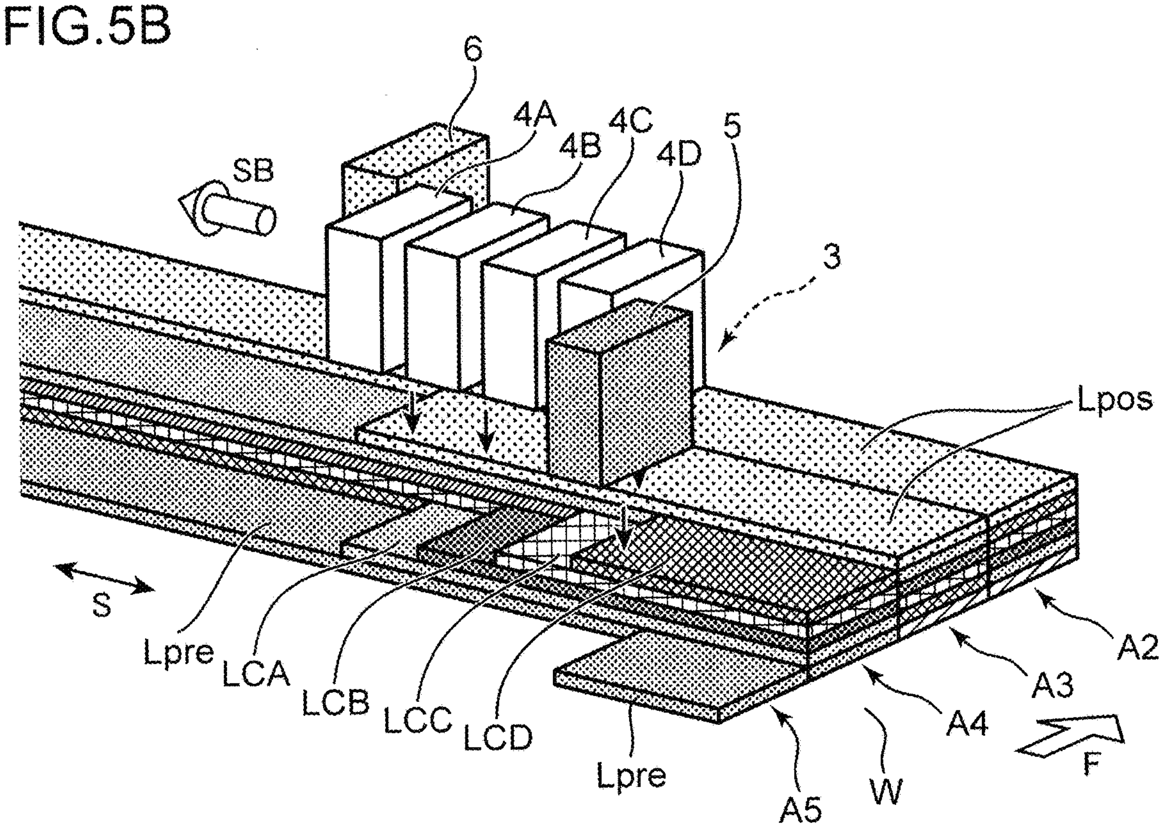
FIG. 5B is a schematic diagram showing the printing situation in the forward path and return path of the carriage.

FIGS. 5A and 5B are each a schematic diagram showing the printing situation in the forward path and return path of the carriage 3. Here, the ink heads 4, the preprocessing head 5, and the postprocessing head 6 mounted on the carriage 3 are simply shown. The ink heads 4 include the first, second, third, and fourth ink heads 4A, 4B, 4C, and 4D for ejecting the inks of first, second, third, and fourth colors different from each other, respectively, and these first to fourth ink heads 4A to 4D align in the main scanning direction S. The preprocessing head 5 is arranged on the upstream side of the ink heads 4 in the conveyance direction F, and the postprocessing head 6 is arranged on the downstream side. As in the case described in FIG. 4, the workpiece W is sent in the conveyance direction F between the forward path printing and the return path printing. The moving distance in the conveyance direction F at this time is the interval pitch (head pitch) between adjacent heads in the conveyance direction F. This moving distance is also the printing width Pw of each of the heads 4, 5, and 6.

FIG. 5A shows the state where the carriage 3 is executing the printing operation while moving in the forward path direction SA in the main scanning direction S (forward path main scan). A region A4 on the workpiece W is the region facing the preprocessing head 5 mounted on the most upstream side of the carriage 3. In the forward path main scan at this time, a preprocessing layer Lpre is formed on the region A4 by the preprocessing solution ejected from the preprocessing head 5.

A region A3 is a region on the downstream side of the region A4 by one head pitch, and is a region facing the ink heads 4. On the region A3, the preprocessing layer Lpre has already been formed over the entire length of the main scanning direction by the previous return path main scan. In the forward path main scan at this time, on the preprocessing layer Lpre of the region A3, first, second, third, and fourth ink layers LCA, LCB, LCC, and LCD are formed with the inks of the first to fourth colors sequentially ejected in the alignment order of the first to fourth ink heads 4A to 4D. Note that FIG. 5A shows that the fourth to first ink layers LCD to LCA are sequentially stacked for easy understanding, but are not stacked in reality. Note that the preprocessing layer Lpre described above and a postprocessing layer Lpos described later are also not formed on the workpiece W.

A region A2 is a region on the downstream side of the region A3 by one head pitch, and is a region facing the postprocessing head 6 mounted on the most downstream side of the carriage 3. On the region A2, the preprocessing layer Lpre by the previous forward path main scan and the first to fourth ink layers LCA to LCD by the previous return path main scan have already been formed over the entire length of the main scanning direction. In the forward path main scan at this time, the postprocessing layer Lpos is formed on the first to fourth ink layers LCA to LCD of the region A2 by the postprocessing solution ejected from the postprocessing head 6.

A region A1 is a region on the downstream side of the region A2 by one head pitch, and is a region through which the carriage 3 has passed and in which the print processing is completed. That is, in the region A1, the preprocessing layer Lpre, the first to fourth ink layers LCA to LCD, and the postprocessing layer Lpos are formed over the entire length of the main scanning direction.

FIG. 5B shows a state in which, after finishing the forward path main scan of FIG. 5A, the carriage 3 turns back and executes the return path main scan while moving in the return path direction SB. Before the turn-back movement, the workpiece W is sent in the conveyance direction F by one head pitch. A region A5 on the workpiece W is a region on the upstream side of the region A4 by one head pitch, and is a region facing the preprocessing head 5 in the return path main scan at this time. The preprocessing layer Lpre is formed on the region A5 with the preprocessing solution ejected from the preprocessing head 5.

The first to fourth ink layers LCA to LCD and the postprocessing layer Lpos are formed on the existing layer in each of the region A4 and the region A3. Specifically, in the region A4, the first to fourth ink layers LCA to LCD are formed on the preprocessing layer Lpre. In the region A3, the postprocessing layer Lpos is formed on the first to fourth ink layers LCA to LCD. The region A2 is a region with the print processing completed, following the region A1.

The print processing is possible in both the forward path main scan and the return path main scan as described above because the preprocessing head 5 and the postprocessing head 6 are shifted in the conveyance direction F with respect to the ink heads 4. If the preprocessing head 5, the ink heads 4, and the postprocessing head 6 align in this order in the main scanning direction S on the carriage 3, the print processing that can eject the preprocessing solution and the postprocessing solution in the desired landing order can be implemented in only one of the forward path and the return path main scan. To enable bi-directional print processing, a pair of the preprocessing head 5 and the postprocessing head 6 needs to be arranged on both sides of the array of the ink heads 4. In this case, the width of the carriage 3 in the main scanning direction S increases. Since such arrangement is unnecessary in the present embodiment, the width of the carriage 3 in the main scanning direction S can be reduced.

Note that the plurality of rows of ink heads 4 can increase the amount of ink that lands on the workpiece W. For example, if there are two rows of the ink heads 4, printing can be executed in the following manner. After the first to fourth ink layers LCA to LCD are formed as described above by the ink heads 4 of the first row, the workpiece W is conveyed by one head pitch in the conveyance direction F, and the first to fourth ink layers LCA to LCD are formed by the ink heads 4 of the second row. In this way, two layers of ink can be printed on the workpiece W.

Figure 6:
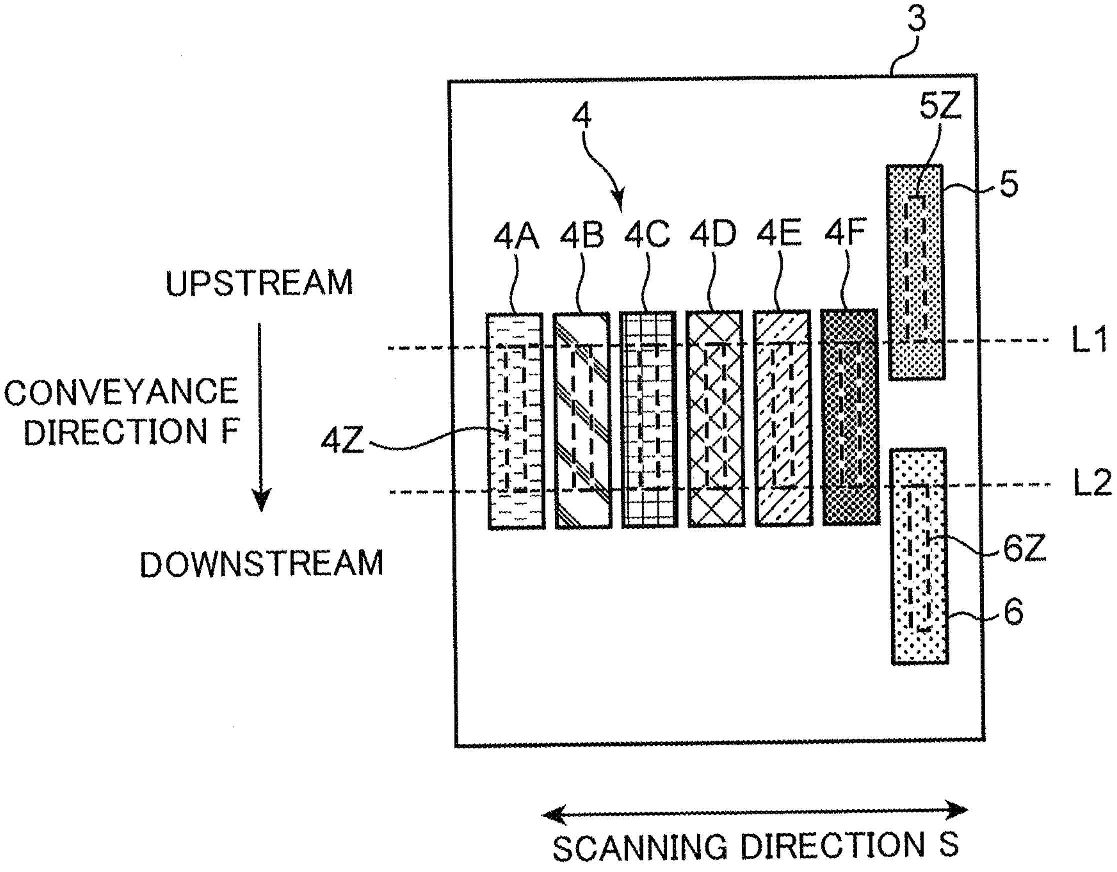
FIG. 6 is the plan view schematically showing arrangement of ink heads and processing heads on the carriage shown in FIG. 3.

FIG. 6 is a plan view schematically showing the head arrangement on the carriage 3 according to the present embodiment, and is also a diagram showing the arrangement of the ink heads 4, the preprocessing head 5, and the postprocessing head 6 (plurality of processing heads) on the carriage 3 shown in FIG. 3. As described above, on the carriage 3, the first to sixth ink heads 4A to 4F ejecting inks of six colors different from each other, the preprocessing head 5, and the postprocessing head 6 are mounted. The number of ink heads 4A to 4F of respective colors, the preprocessing head 5, and the postprocessing head 6 provided is one each. A group of the first to sixth ink heads 4A to 4F that constitute the ink heads 4 is arranged to align in the main scanning direction S in the central region of the carriage 3 in the conveyance direction F. When viewed along the main scanning direction S, the downstream end of the preprocessing head 5 in the conveyance direction F is arranged to overlap the upstream end of the ink heads 4 in the conveyance direction F. Similarly, when viewed along the main scanning direction S, the downstream end of the ink heads 4 in the conveyance direction F is arranged to overlap the upstream end of the postprocessing head 6 in the conveyance direction F.

Note that unless otherwise stated, in each figure including FIG. 6, the spacing between adjacent heads in the main scanning direction S (spacing between centers of respective heads) is the same. Similarly, the spacing between adjacent heads in the conveyance direction F (spacing between centers of respective heads) is the same.

FIG. 6 schematically illustrates the nozzle region arranged on the lower surface of each head inside the external shape of the head by dashed lines. The nozzle region is a region defined by nozzles that are arranged on the lower surface of each head to eject a liquid during printing. In each head, a plurality of nozzles is formed to align along the main scanning direction S and the conveyance direction F in the nozzle region.

Upstream and downstream ends of the nozzle regions of the first ink heads 4A to the sixth ink heads 4F in the conveyance direction F are arranged at the same position as each other in the conveyance direction F. The upstream ends of the nozzle regions of the first ink heads 4A to the sixth ink heads 4F in the conveyance direction F are arranged continuously in the conveyance direction F with respect to the downstream end of the nozzle region of the preprocessing head 5 in the conveyance direction F (adjoining, adjacent). The upstream end of the nozzle region of the postprocessing head 6 in the conveyance direction F is arranged continuously in the conveyance direction F with respect to the downstream ends of the nozzle regions of the first ink heads 4A to the sixth ink heads 4F in the conveyance direction F.

The arrangement regions of respective nozzles are arranged such that the ink and respective processing solutions land adjacent to each other in units of resolution. Therefore, the landing region of the preprocessing solution and the ink landing region of the first ink heads 4A to the sixth ink heads 4F are continuous (adjacent) at the preprocessing/ink head boundary L1, and the ink landing region of the nozzle regions of the first ink heads 4A to the sixth ink heads 4F and the landing region of the postprocessing solution are continuous at the ink/postprocessing head boundary L2.

Figure 7:
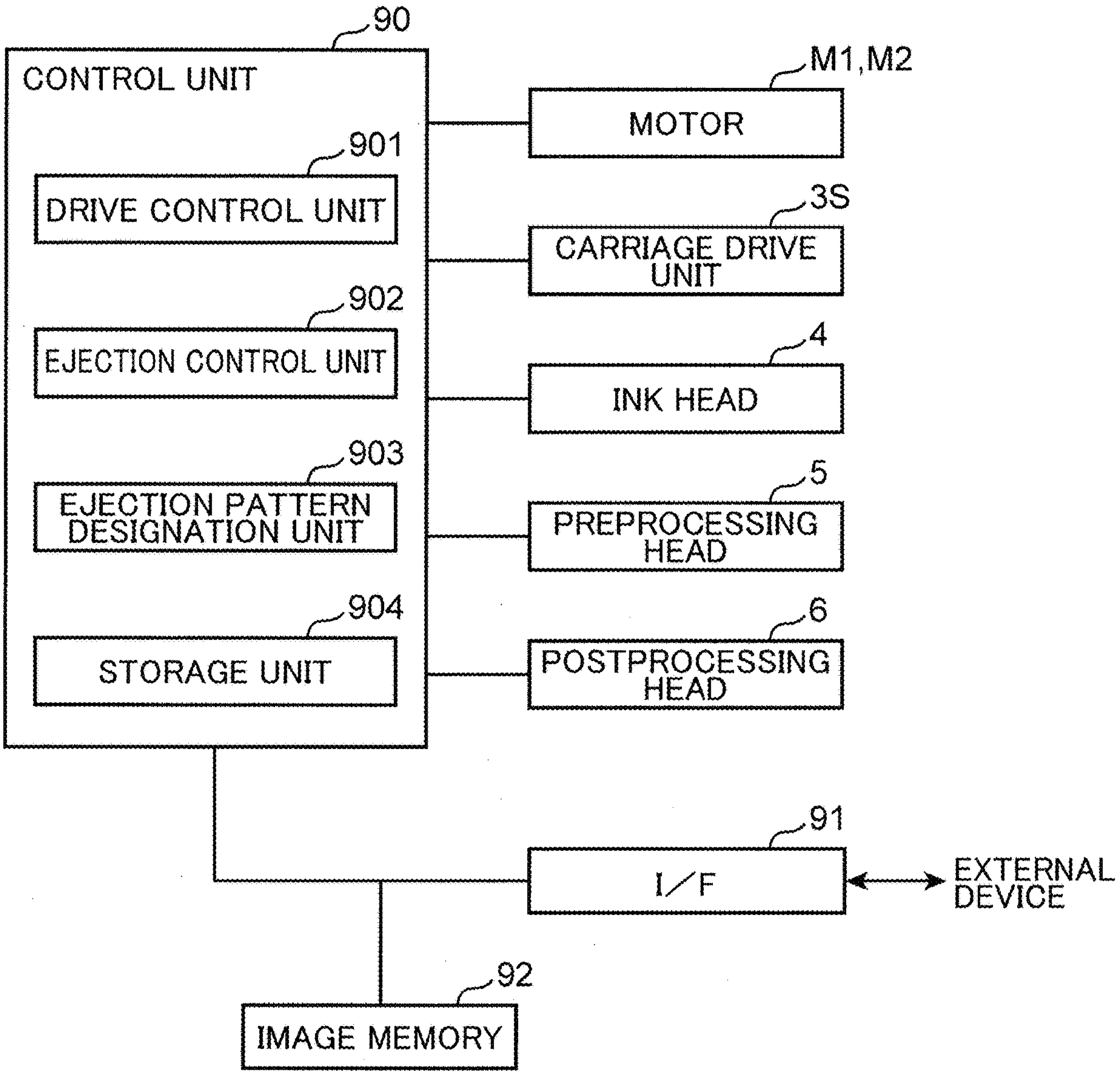
FIG. 7 is a block diagram of the inkjet recording device according to one embodiment of the present disclosure.

FIG. 7 is a block diagram of the inkjet printer 1 according to the present embodiment. The inkjet printer 1 further includes a control unit 90 that comprehensively controls the operation of each unit of the inkjet printer 1, a carriage drive unit 3S, an I/F 91, and an image memory 92. The control unit 90 includes a central processing unit (CPU), a read only memory (ROM) that stores a control program, a random access memory (RAM) used as a work area for the CPU, and the like. In addition, the carriage drive unit 3S, the I/F 91, the image memory 92, and the like are electrically connected to the control unit 90, in addition to the first motor M1 and second motor M2, the ink heads 4, the preprocessing head 5, and the postprocessing head 6 described above. The carriage drive unit 3S includes a motor (not shown) that causes the timing belt 16 to go around to cause the carriage 3 to reciprocate along the main scanning direction S.

The image memory 92 temporarily stores, for example, print image data supplied from an external device such as a personal computer.

The I/F 91 is an interface circuit for implementing data communication with an external device, for example, creates a communication signal according to the communication protocol of the network that connects the inkjet printer 1 to the external device, and converts the communication signal from the network side into data in a format that can be processed by the inkjet printer 1. A print instruction signal transmitted from the personal computer or the like is given to the control unit 90 via the I/F 91, and the image data is stored in the image memory 92 via the I/F 91.

The control unit 90 functions to include a drive control unit 901, an ejection control unit 902, an ejection pattern designation unit 903, and a storage unit 904 by the CPU executing the control program stored in the ROM.

The drive control unit 901 controls the conveyance operation of the workpiece W by controlling the first motor M1 and the second motor M2 of the workpiece conveyance unit 20. The drive control unit 901 controls the reciprocation of the carriage 3 along the main scanning direction S by controlling the carriage drive unit 3S.

The ejection control unit 902 inputs a prescribed command signal to the ink heads 4, the preprocessing head 5, and the postprocessing head 6, and controls ejection operations of the inks of respective colors, the preprocessing solution, and the postprocessing solution.

The ejection pattern designation unit 903 designates the ejection pattern for each head to land the ink at a prescribed position on the workpiece W according to image information received from the I/F 91 or the image memory 92. In more detail, the ejection pattern designation unit 903 designates the ink ejection amount (ejection pattern) in the ink heads 4 of respective colors, and inputs a signal corresponding to the ejection amount and the ejection timing to the ejection control unit 902. The ejection pattern designation unit 903 executes the same control as above for the preprocessing head 5 that ejects the preprocessing solution and the postprocessing head 6 that ejects the postprocessing solution.

The storage unit 904 stores in advance various thresholds, parameters, and the like that are referred to by the drive control unit 901, the ejection control unit 902, and the ejection pattern designation unit 903 of the control unit 90.

Note that the structure of the control unit 90 is not limited to the above aspect, but may be an aspect different from the above aspect depending on the structure of the device and program. In other words, it can be said that the functions of the drive control unit 901, the ejection control unit 902, the ejection pattern designation unit 903, and the storage unit 904 are executed by the control unit 90.

<Ejection of Each Processing Solution and Ink>

As shown in FIG. 6, in the head arrangement in the present embodiment, one preprocessing head 5 is arranged on the upstream side of the ink heads 4, and one postprocessing head 6 is arranged on the downstream side in the conveyance direction F. That is, it is possible to provide the all-in-one inkjet printer 1 in which three types of ejection heads for the preprocessing solution, the ink, and the postprocessing solution are mounted on one carriage 3. Since the preprocessing head 5, the ink heads 4, and the postprocessing head 6 are arranged sequentially in the conveyance direction F, the preprocessing solution, the ink, and the postprocessing solution can be ejected in the desired landing order in both the forward path main scan and the return path main scan.

As described above, in the present embodiment, the inkjet printer 1 includes the workpiece conveyance unit 20 that conveys the workpiece W in the prescribed conveyance direction F, the carriage 3 that reciprocates along the main scanning direction S that intersects the conveyance direction F, the preprocessing head 5 mounted on the carriage 3 to eject the non-coloring preprocessing solution, the ink heads 4 mounted on the carriage 3 to eject the ink, and the postprocessing head 6 mounted on the carriage 3 to eject the non-coloring postprocessing solution. When the ejection control unit 902 controls the ejection of each head according to the movement of the carriage 3 in the main scanning direction S, after the preprocessing head 5 ejects the preprocessing solution onto the prescribed recording region (pixel) on the workpiece W with first movement of the carriage 3 along the main scanning direction S, the workpiece conveyance unit 20 conveys the workpiece W at a prescribed pitch in the conveyance direction F (FIG. 6), furthermore, after the ink heads 4 eject the ink onto the recording region with second movement of the carriage 3 along the main scanning direction S, the workpiece conveyance unit 20 further conveys the workpiece W in the conveyance direction F, and the postprocessing head 6 ejects the postprocessing solution onto the recording region with third movement of the carriage 3 along the main scanning direction S, thereby forming an ink image including the preprocessing solution, the ink, and the postprocessing solution on the recording region. Therefore, in the present embodiment, the preprocessing head 5, the ink heads 4, and the postprocessing head 6 are arranged to be shifted from each other in the conveyance direction F (FIG. 6). Therefore, the preprocessing solution, the ink, and the postprocessing solution can be reliably and stably applied to the workpiece W in this order. As a result, high-quality printing on the workpiece W can be reliably achieved. Note that as one example, the first movement of the carriage 3 is one direction in the main scanning direction S (from right to left in FIG. 6), the second movement is the other direction in the main scanning direction S (from left to right in FIG. 6), and the third movement is the one direction in the main scanning direction S.

That is, in the present embodiment, assuming that the movement of the carriage 3 when the preprocessing head 5 ejects the preprocessing solution while moving along the main scanning direction S with respect to the prescribed region on the workpiece W is a first scan, that the movement of the carriage 3 when the ink heads 4 eject the ink while moving along the main scanning direction S with respect to the prescribed region is a second scan, and that the movement of the carriage 3 when the postprocessing head 6 ejects the postprocessing solution while moving along the main scanning direction S with respect to the prescribed region is a third scan, the first scan, the second scan, and the third scan are scans different from each other, and the first scan, the second scan, and the third scan are each executed at least once in this order. As a result, the preprocessing solution, the ink, and the postprocessing solution can be more reliably applied to the workpiece W in this order. Note that the prescribed region on the workpiece W is a region equal to or smaller than the region printed by one scan.

Note that the present disclosure is not limited to an aspect in which one row of ink heads 4 is arranged along the main scanning direction S as in the present embodiment, but may be an aspect in which two or more rows of ink heads 4 are arranged in the conveyance direction F and the ink heads 4 of each row are arranged along the main scanning direction S. The ink heads 4 are not limited to heads that form an image of a plurality of colors, but one ink head 4 that ejects a single-color ink may be mounted on the carriage 3. In this case as well, it is required at least that the preprocessing head 5, the ink head 4, and the postprocessing head 6 are arranged in this order to be shifted in the conveyance direction.

Furthermore, in the present embodiment, the carriage 3 includes the back frame 32 (engagement unit) held in a cantilevered state by the guide rails 17 (holding member). By causing the timing belt 16 to cantilever the carriage 3, the structure can be simplified. In addition, by cantilevering the carriage, it is possible to easily create a structure in which the downstream side of the carriage 3 is open, and to make it easy to maintain the ink heads 4 and the processing heads 5 and 6.

In the carriage 3 that is thus cantilevered, the preprocessing head 5 is arranged on the proximal side 311 (close side to the engagement unit) of the head support frame 31, and the postprocessing head 6 is arranged on the distal side 312 (far side from the engagement unit). Unlike the proximal side 311 close to the back frame 32 fixed to the timing belt 16, it is assumed that the positional precision on the distal side 312, which is a free end, will decrease. However, on the distal side 312, the postprocessing head 6, which does not require relatively high degree of severe ejection precision, is mounted. Since the postprocessing solution coats the ink image printed on the workpiece W, even if deviation of the landing position occurs, the relative influence on the image quality can be made smaller than deviation of the landing position of the same degree in the preprocessing solution. Therefore, even when the cantilevered carriage 3 is used, it is possible to make the decrease in image quality difficult to occur.

<Problem in Scanning of Carriage>

Figure 10:
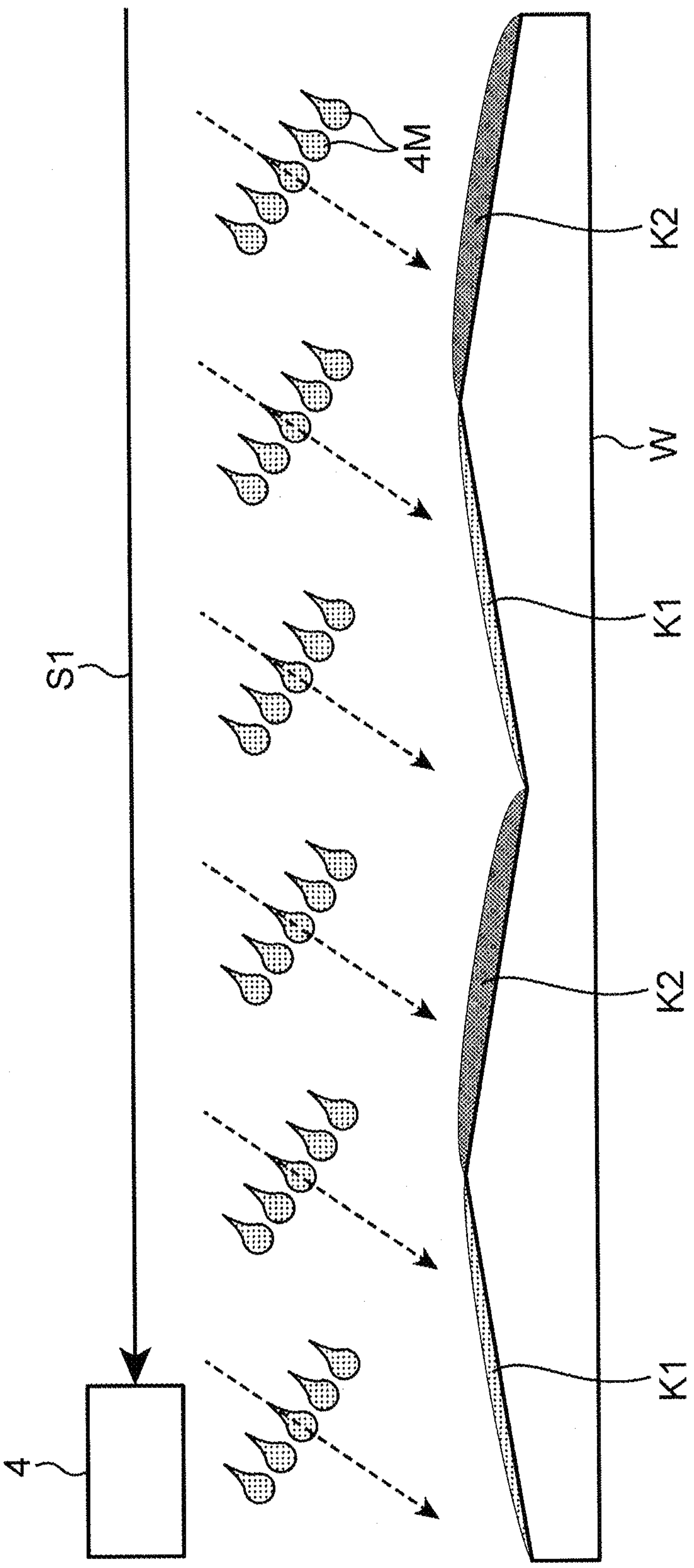
FIG. 10 is a schematic diagram showing how an ink lands on the surface of the recording medium with movement of the carriage.

FIG. 10 is a schematic diagram showing how the ink 4M lands on the surface of the workpiece W with the movement of the carriage 3. When the workpiece W includes fabrics such as woven or knitted fabrics, or is paper including paper fibers, various kinds of unevenness exists on the surface. For fabrics, unevenness exists between adjacent threads depending on the surface undulations caused by the weaving process or the knitting process, the thickness of the threads, and the way of twisting. In general, the uneven shape is larger than the ink dot diameter of several tens of micrometers, or even if not so, the uneven shape has a size that cannot be ignored with respect to the ink dot diameter. For paper, minute unevenness exists due to random distribution of paper fibers on the surface, and depending on the type of paper, the unevenness may have a size that cannot be ignored with respect to the ink dot diameter. In other words, the recording medium, such as fabrics or some type of paper, may have, on the surface, an uneven shape with a period that cannot be ignored with respect to the dot diameter of the ejected ink.

In FIG. 10, when the ink head 4 ejects the ink 4M while moving in the main scanning direction S1 from right to left on the paper surface with the movement of the carriage (not shown), since the moving speed of the ink head 4 and the ejection speed of the ink 4M are combined, each ink 4M lands on the workpiece W while being inclined along the direction as indicated by the arrow of FIG. 10. At this time, for example, when the workpiece W has an uneven shape in which a first surface K1 and a second surface K2 that are each inclined alternately exist, as shown in FIG. 10, on the first surface K1 nearly parallel to the ejection direction of the ink 4M, the landing amount (application amount) of the ink 4M per unit area is relatively small, while on the second surface K2 nearly perpendicular to the ejection direction of the ink 4M, the landing amount of the ink 4M per unit area is relatively large. Such a phenomenon is caused by the area where the same amount of ink 4M lands on the first surface K1 being larger than the area on the second surface K2.

Furthermore, before the landing of the ink 4M as described above, when the preprocessing head 5 ejects the preprocessing solution while moving in the main scanning direction S1 in FIG. 10, while the landing amount of the preprocessing solution per unit area is relatively small on the first surface K1, the landing amount of the preprocessing solution per unit area is relatively large on the second surface K2. As a result, while a small amount of ink lands on a small amount of preprocessing solution on the first surface K1, a large amount of ink lands on a large amount of preprocessing solution on the second surface K2.

As described above, the preprocessing solution has a function of enhancing fixability of the ink on the surface of the workpiece W. For example, when the ink to use has high permeability, the preprocessing solution acts to suppress the permeation and solidify the ink on the surface (to increase the amount of fixed ink). Meanwhile, when the ink to use has low permeability, the preprocessing solution acts to retain the ink on the surface. In this way, although the characteristics of the preprocessing solution differ depending on the characteristics of the ink to use, in either case, the preprocessing solution exhibits a function of enhancing the fixability of the ink on the surface of the workpiece W.

When the preprocessing solution has such functions and both the preprocessing solution and the ink are scarce on the first surface K1 of FIG. 10, the amount of ink fixed on the surface decreases, and the density on the workpiece W is relatively low. As a result, the relative density difference is remarkable between the first surface K1 and the second surface K2 on which both the preprocessing solution and the ink are abundant, and density unevenness occurs on the workpiece W.

Similarly, when the postprocessing head 6 ejects the postprocessing solution while moving in the main scanning direction S1 of FIG. 10 after the landing of the ink 4M as in FIG. 10, while the landing amount of the postprocessing solution per unit area is relatively small on the first surface K1, the landing amount of the postprocessing solution per unit area is relatively large on the second surface K2. As a result, while a small amount of postprocessing solution lands on a small amount of ink on the first surface K1, a large amount of postprocessing solution lands on a large amount of ink on the second surface K2.

When the postprocessing solution has a function of enhancing the fixability and fastness (resistance to rubbing and scraping, abrasion resistance) of the ink image printed on the workpiece W, if both the ink and the postprocessing solution are scarce on the first surface K1, the amount of ink applied is small and the scratch resistance is low. Therefore, when a long time has passed after printing on the workpiece W, the density becomes relatively lower than other portions such as the second surface K2, and density unevenness occurs on the workpiece W. Such a decrease in density is also increased by washing, rubbing, wind and rain, and the like.

In the present embodiment, to eliminate the occurrence of a region with less ink and processing solution and a region with more ink and processing solution, and the occurrence of a density difference between the two regions due to the scanning direction of each head as described above, the ink heads 4, the preprocessing head 5, and the postprocessing head 6 are suitably arranged on the carriage 3, and the control unit 90 suitably controls the solution ejection timing from each ink head.

That is, in the present embodiment, as described above, assuming that the movement of the carriage 3 when the preprocessing head 5 ejects the preprocessing solution while moving along the main scanning direction S is the first scan, that the movement of the carriage 3 when the ink heads 4 eject the ink while moving along the main scanning direction S is the second scan, and that the movement of the carriage 3 when the postprocessing head 6 ejects the postprocessing solution while moving along the main scanning direction S is the third scan, the movement direction of the carriage 3 differs from each other between the first scan and the second scan, which are continuous with each other. As a result, for example, while a small amount of the preprocessing solution and a large amount of the ink are applied to the first surface K1 of FIG. 10, a large amount of the preprocessing solution and a small amount of the ink are applied to the second surface K2. Therefore, as described above, the region with less preprocessing solution and ink and the region with more preprocessing solution and ink do not occur on the workpiece W due to the scanning direction of the preprocessing head 5 and the ink heads 4, and it is possible to prevent the occurrence of the density differences between the two regions. In particular, by reducing the occurrence of a portion where the amount of ink existing on the surface of the workpiece W is extremely small, the amount of ink on the workpiece W can be made uniform and the density unevenness can be reduced. As a result, the image quality of the workpiece W can be improved. Note that if the ink heads 4 are arranged in two or more rows, it is required at least that the ink heads 4 located immediately downstream of (immediately after) the preprocessing head 5 and the preprocessing head 5 satisfy the relationship described above. The same applies to the case where the preprocessing heads 5 are arranged in two or more rows. That is, it is required at least that the movement direction of the carriage 3 differs between one scan of the first scan and one scan of the second scan that are continuous with each other.

Similarly, in the present embodiment, the movement direction of the carriage 3 differs from each other between the second scan and the third scan that are continuous with each other. In this case as well, while a small amount of the ink and a large amount of the postprocessing solution are applied to the first surface K1 of FIG. 10, a large amount of the ink and a small amount of the postprocessing solution are applied to the second surface K2. Therefore, as described above, the region with less ink and postprocessing solution and the region with more ink and postprocessing solution do not occur due to the scanning direction of the ink heads 4 and the postprocessing head 6, and it is possible to prevent the occurrence of the density differences between the two regions. In particular, since the occurrence of a portion with a small amount of ink and low abrasion resistance is reduced, it is possible to reduce the occurrence of a portion where the density after a long time has passed is extremely lower than in other portions. As a result, the density unevenness when a long time has passed after printing is reduced, and it is possible to maintain stable images over a long period of time and improve the quality of printed matters. Note that if the ink heads 4 are arranged in two or more rows, it is required at least that the ink heads 4 located immediately upstream of (immediately before) the postprocessing head 6 and the postprocessing head 6 satisfy the relationship described above. The same applies to the case where the postprocessing heads 6 are arranged in two or more rows. That is, it is required at least that the movement direction of the carriage 3 differs from each other between one scan of the second scan and one scan of the third scan that are continuous with each other.

In the example of FIG. 10, it has been described that the landing amount of solution changes depending on the main scanning direction because the landing surface of the workpiece W is inclined. For fabrics and the like, in addition to the case where the landing surface is simply inclined, the landing amount of solution may change depending on the main scanning direction because protrusions and recesses have a distorted shape. In such a case as well, by reversing the scanning direction of the carriage 3 in the first movement (first scan) and the scanning direction of the carriage 3 in the second movement (second scan), improvement can be achieved as described above. Similarly, by reversing the scanning direction of the carriage 3 in the second movement and the scanning direction of the carriage 3 in the third movement (third scan), improvement can be achieved as described above.

Furthermore, as shown in FIG. 6, in the present embodiment, the preprocessing head 5 includes a preprocessing nozzle region 5Z, each ink head 4 includes an ink nozzle region 4Z, and the postprocessing head 6 includes a postprocessing nozzle region 6Z. The preprocessing nozzle region 5Z is a region arranged opposite the workpiece W at the image forming position and defined by a plurality of preprocessing nozzles that each eject the preprocessing solution with the first movement of the carriage 3. Similarly, the ink nozzle region 4Z is a region arranged opposite the workpiece W at the image forming position and defined by a plurality of ink nozzles that each eject the ink with the second movement of the carriage 3. Furthermore, the postprocessing nozzle region 6Z is a region arranged opposite the workpiece W at the image forming position and defined by a plurality of postprocessing nozzles that each eject the postprocessing solution with the third movement of the carriage 3. In FIG. 6, when viewed along the main scanning direction S, the preprocessing nozzle region 5Z, the ink nozzle region 4Z, and the postprocessing nozzle region 6Z are arranged not to overlap each other, and are arranged continuously (lie in a line, adjacent) along the conveyance direction F.

In the present embodiment, the length of each of the preprocessing nozzle region 5Z, the ink nozzle region 4Z, and the postprocessing nozzle region 6Z in the conveyance direction F is set to be equal to or greater than the maximum value of the conveyance pitch (maximum feed pitch) of the workpiece W.

With such a configuration, even if the workpiece conveyance unit 20 intermittently conveys the workpiece W at the maximum conveyance pitch, no image gap is formed on the workpiece W, making it possible to form a high-quality image in a short time.

Furthermore, the distance in the conveyance direction F from the downstream end of the ink nozzle region 4Z in the conveyance direction F to the downstream end of the postprocessing nozzle region 6Z in the conveyance direction F is preferably set to be equal to or greater than the length of the ink nozzle region 4Z in the conveyance direction F.

Since such a configuration allows the postprocessing solution to be reliably printed at an ink printable pitch, it is possible to execute high-quality printing in a short time without omission of the postprocessing solution. Note that in this case, the postprocessing nozzle region 6Z may extend upstream or downstream of the conveyance direction F longer than the range of FIG. 6. When there is a plurality of rows of the ink heads 4, the distance in the conveyance direction F from the downstream end of the ink nozzle region 4Z in the conveyance direction F in the most downstream ink head 4 in the conveyance direction F to the downstream end of the postprocessing nozzle region 6Z in the conveyance direction F is required at least to be set to be equal to or greater than the length of the ink nozzle region 4Z in the conveyance direction F. In other words, the distance in the conveyance direction F from the downstream end of the ink nozzle regions 4Z of the plurality of rows of ink heads 4 regarded as one ink nozzle region in the conveyance direction F to the downstream end of the postprocessing nozzle region 6Z in the conveyance direction F is required at least to be set to be equal to or greater than the length of the ink nozzle regions 4Z in the conveyance direction F.

In FIG. 6, the preprocessing head 5 and the postprocessing head 6 are arranged at the same position in the main scanning direction S. With such arrangement, the length of the carriage 3 in the main scanning direction S can be shortened. The position of the preprocessing head 5 and the postprocessing head 6 in the main scanning direction S may be any position with respect to the first to sixth ink heads 4A to 4F. In FIG. 6, the preprocessing head 5 and the postprocessing head 6 are arranged at the right end of the first to sixth ink heads 4A to 4F aligned in the main scanning direction S. If arranged at the right end or opposite left end in this way, when using the preprocessing solution or the postprocessing solution that reacts with the ink, it is possible to make it difficult for the mist attached to the carriage 3 to react and stick.

Figure 8:
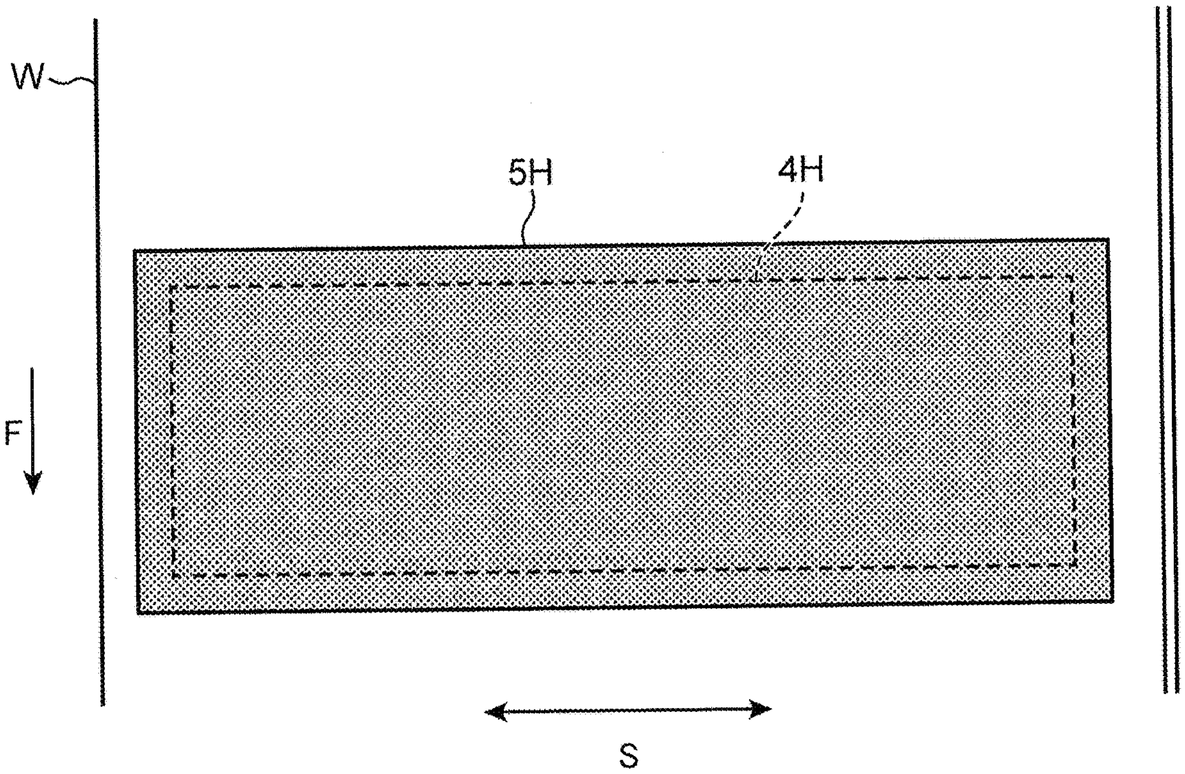
FIG. 8 is a plan view showing the relationship between a preprocessing solution landing region and an ink landing region on a recording medium in the inkjet recording device according to one embodiment of the present disclosure.
Figure 9:
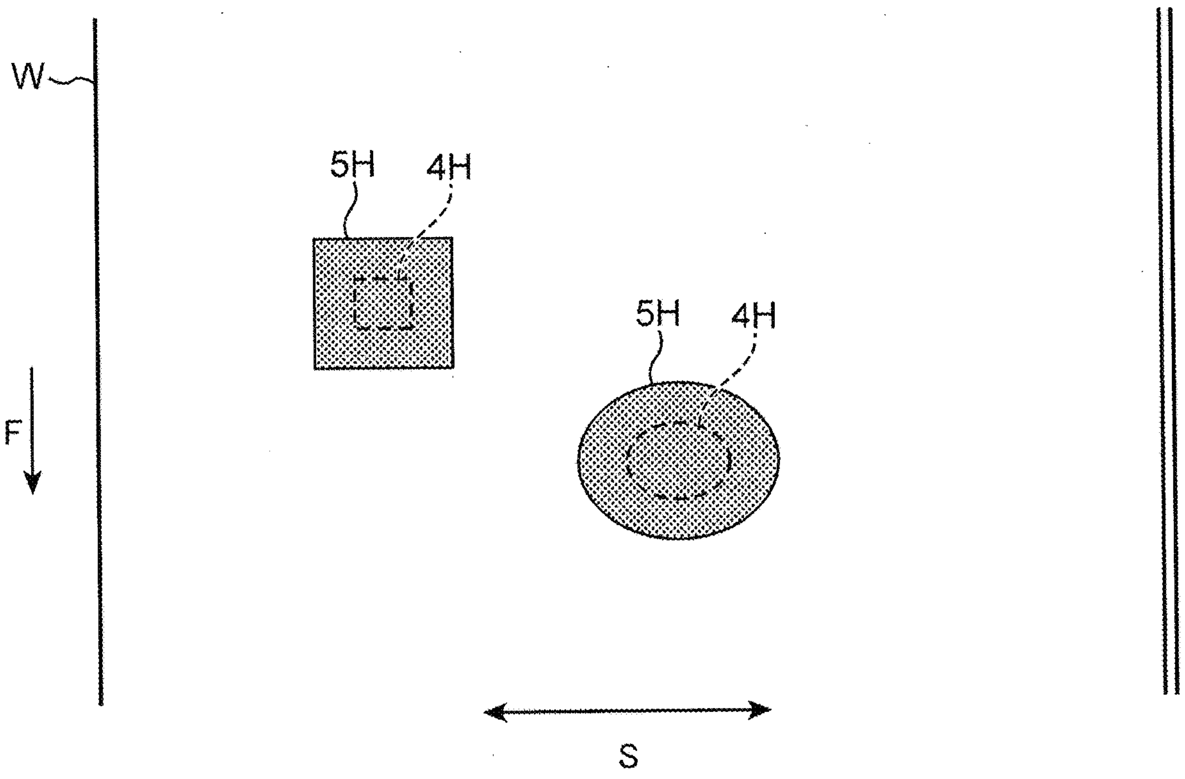
FIG. 9 is a plan view showing the relationship between the preprocessing solution landing region and the ink landing region on the recording medium in the inkjet recording device according to one embodiment of the present disclosure.

FIGS. 8 and 9 are plan views each showing the relationship between the preprocessing solution landing region and the ink landing region on the workpiece W in the inkjet printer 1 according to the present embodiment. In the present embodiment, the ejection pattern designation unit 903 (control unit 90) designates ejection timing of the preprocessing head 5 and the ink heads 4 according to prescribed image information such that the region where the preprocessing solution lands is wider than the region where the ink lands according to the image information.

As shown in FIG. 8, when an ink image is formed over a wide range on the workpiece W, the preprocessing solution landing region 5H is set in advance in a wider range than the ink image, and the preprocessing solution ejected from the preprocessing head 5 lands. Then, the ink ejected from the ink heads 4 lands on the ink landing region 4H corresponding to the ink image. Meanwhile, as shown in FIG. 9, even if the ink image is partially formed on the workpiece W, the preprocessing solution landing region 5H is required at least to be set wider (larger) than the ink landing region 4H. Since such control makes it possible to reliably apply the preprocessing solution to the entire region to which the ink is applied, printing quality can be improved by stably exhibiting the action between the preprocessing solution and the ink.

In particular, in the present embodiment, the ejection pattern designation unit 903 (control unit 90) designates the ejection timing for the preprocessing head 5 and the ink heads 4 such that the region 5H where the preprocessing solution lands contains the region 4H where the ink lands from the surroundings, as shown in FIGS. 8 and 9. As a result, it is possible to apply the preprocessing solution more reliably to the entire region to which the ink is applied.

Note that the aspect in which the preprocessing solution landing region 5H is set relatively widely with respect to the ink landing region 4H is not limited to the aspect of containment from the surroundings as described above. The preprocessing solution landing region 5H may be set widely only in the conveyance direction F with respect to the ink landing region 4H and equally in the main scanning direction S, or the preprocessing solution landing region 5H may be set widely only in the main scanning direction S with respect to the ink landing region 4H and equally in the conveyance direction F. Furthermore, when the ink landing region 4H has a ring shape, the preprocessing solution landing region 5H is required at least to have a wider ring shape. The ink landing region 4H and the preprocessing solution landing region 5H formed by ejecting the ink and the preprocessing solution from the ink heads 4 and the preprocessing head 5 respectively may be set by editing the print pattern (print image information) in advance, or the ejection timing of each head may be set early or late according to the print pattern.

Note that as described above, with the configuration where the preprocessing solution is printed on the entire surface with a wider range than the ink regardless of the size of the ink image, it is also possible to reduce the amount of preprocessing solution used than in the case where the entire workpiece W is immersed in the preprocessing solution in advance.

In the aspect in which the preprocessing solution is selectively printed as described above, the preprocessing solution is printed over a wider range than the ink in response to the ink print pattern that requires more suppression of bleeding in some cases. In this case, if the ink landing region 4H and the preprocessing solution landing region 5H are set in the same range, printing may not be possible in the required portion. Therefore, the print range of the preprocessing solution is preferably extended as described above.

Furthermore, in the present embodiment, the conveyance speed of the workpiece W and the scanning speed of the carriage 3 are set such that the time from the landing of the preprocessing solution to the landing of the postprocessing solution on a prescribed pixel on the workpiece W is included in (within) the range of 0.5 (sec) or more and 10 (sec) or less in the entire workpiece W.

With such a configuration, high printing quality can be secured in the entire print range of the workpiece W. In particular, if the time from the landing of the preprocessing solution to the landing of the postprocessing solution is less than 0.5 (sec), image quality such as color development, texture, and fastness are likely to decrease. If the time from the landing of the preprocessing solution to the landing of the postprocessing solution exceeds 10 (sec), the difference in image quality between the lower limit value and the upper limit value of the time, that is, variation in image quality is likely to increase.

The inkjet printer 1 according to one embodiment of the present disclosure has been described above, but the present disclosure is not limited to this embodiment, and for example, the following modified embodiment can be employed.

In the above embodiment, descriptions have been given in the aspect in which in the configuration in which the preprocessing head 5 includes the preprocessing nozzle region 5Z, each ink head 4 includes the ink nozzle region 4Z, and the postprocessing head 6 includes the postprocessing nozzle region 6Z, as in FIG. 6, when viewed along the main scanning direction S, the preprocessing nozzle region 5Z, the ink nozzle region 4Z, and the postprocessing nozzle region 6Z are arranged not to overlap each other. Meanwhile, the regions where the nozzles of respective heads are arranged may be arranged such that the ends of the regions partially overlap each other when viewed along the main scanning direction S. In this case, the nozzles (actual ejection nozzles) that are controlled by the ejection control unit 902 to eject the ink or each processing solution during printing are preferably controlled not to overlap each other when viewed along the main scanning direction S. That is, in the present disclosure, the plurality of nozzles (preprocessing nozzles, ink nozzles, postprocessing nozzles) that eject solutions (preprocessing solution, ink, postprocessing solution) respectively with the movement of the carriage 3 (first movement, second movement, third movement) means nozzles that actually eject each solution during printing.

That is, the nozzles of each head are not limited to the nozzles that eject the solution from all the nozzles that are provided in advance, but may be controlled such that the solution is ejected from some of the nozzles. Among the preprocessing nozzle region, the ink nozzle region, and the postprocessing nozzle region, the length of the region with the shortest length in the conveyance direction F is preferably longer than half the length of the region with the longest length. By such control, high-quality printing can be achieved in a short time. Note that in each head, the plurality of nozzles is required at least to be arranged to align in the conveyance direction F, and the number of nozzles to align in the main scanning direction S is not limited.

Part or all of the control unit 90 of the inkjet printer 1 may be a personal computer or the like that transmits print image information to the inkjet printer 1.

The invention claimed is:

1. An inkjet recording device comprising:

a conveyance unit configured to convey a recording medium in a conveyance direction;

a carriage configured to reciprocate along a main scanning direction that intersects the conveyance direction;

at least one preprocessing head on the carriage configured to eject a non-coloring preprocessing solution;

at least one ink head on the carriage configured to eject an ink; and at least one postprocessing head on the carriage configured to eject a non-coloring postprocessing solution, wherein, when viewed along the main scanning direction, a downstream end of the at least one preprocessing head in the conveyance direction is arranged to overlap an upstream end of the at least one ink head in the conveyance direction, and a downstream end of the at least one ink head in the conveyance direction is arranged to overlap an upstream end of the at least one postprocessing head in the conveyance direction.

2. The inkjet recording device according to claim 1, wherein assuming that movement of the carriage when the preprocessing head ejects the preprocessing solution while moving along the main scanning direction with respect to a region on the recording medium is a first scan, that movement of the carriage when the ink head ejects the ink while moving along the main scanning direction with respect to the region is a second scan, and that movement of the carriage when the postprocessing head ejects the postprocessing solution while moving along the main scanning direction with respect to the region is a third scan, the first scan, the second scan, and the third scan are scans different from each other, and the first scan, the second scan, and the third scan are each executed at least once in this order.

3. The inkjet recording device according to claim 2, wherein a movement direction of the carriage differs from each other between the first scan and the second scan that are continuous with each other.

4. The inkjet recording device according to claim 2, wherein the movement direction of the carriage differs from each other between the second scan and the third scan that are continuous with each other.

5. The inkjet recording device according to claim 1, wherein the at least one preprocessing head includes a preprocessing nozzle region defined by a plurality of preprocessing nozzles each configured to eject the preprocessing solution with the movement of the carriage, the at least one ink head includes an ink nozzle region defined by a plurality of ink nozzles each configured to eject the ink with the movement of the carriage, the at least one postprocessing head includes a postprocessing nozzle region defined by a plurality of postprocessing nozzles each configured to eject the postprocessing solution with the movement of the carriage, and when viewed along the main scanning direction, the preprocessing nozzle region, the ink nozzle region, and the postprocessing nozzle region are arranged not to overlap each other.

6. The inkjet recording device according to claim 5, wherein the conveyance unit intermittently conveys the recording medium at a conveyance pitch, and a length of each of the preprocessing nozzle region, the ink nozzle region, and the postprocessing nozzle region in the conveyance direction is set to be equal to or greater than a maximum value of the conveyance pitch.

7. The inkjet recording device according to claim 5, wherein a distance in the conveyance direction from a downstream end of the ink nozzle region in the conveyance direction to a downstream end of the postprocessing nozzle region in the conveyance direction is set to be equal to or greater than the length of the ink nozzle region in the conveyance direction.

8. The inkjet recording device according to claim 1, further comprising a control unit configured to designate ejection timing of the preprocessing head and the ink head according to prescribed image information such that a region where the preprocessing solution corresponding to the image information lands is larger than a region where the ink lands and contains the region where the ink lands.

9. The inkjet recording device according to claim 1, wherein a conveyance speed of the recording medium and a scanning speed of the carriage are set such that time from the landing of the preprocessing solution to the landing of the postprocessing solution on a pixel on the recording medium is within a range of 0.5 (sec) or more and 10 (sec) or less in the entire recording medium.

10. The inkjet recording device according to claim 1, wherein the at least one preprocessing head includes the preprocessing nozzle region defined by the plurality of preprocessing nozzles each configured to eject the preprocessing solution with the movement of the carriage, the at least one ink head includes the ink nozzle region defined by the plurality of ink nozzles each configured to eject the ink with the movement of the carriage, the at least one postprocessing head includes the postprocessing nozzle region defined by the plurality of postprocessing nozzles each configured to eject the postprocessing solution with the movement of the carriage, and among the preprocessing nozzle region, the ink nozzle region, and the postprocessing nozzle region, the length of the region with a shortest length in the conveyance direction is longer than half the length of the region with a longest length.

* * * * *